United States Patent
Pu et al.

(10) Patent No.: US 7,965,748 B2
(45) Date of Patent: Jun. 21, 2011

(54) LASER PUMP CAVITY

(75) Inventors: Gang Pu, Shenzhen (CN); Gang Xiao, Shenzhen (CN); Jianfei Chen, Shenzhen (CN); Yanqing Yang, Shenzhen (CN); Yunfeng Gao, Shenzhen (CN)

(73) Assignee: Shenzhen Han's Laser Technology Co. Ltd., Guangdong Province (CN)

( * ) Notice: Subject to any disclaimer, the term of this patent is extended or adjusted under 35 U.S.C. 154(b) by 0 days.

(21) Appl. No.: 12/445,298

(22) PCT Filed: Dec. 12, 2006

(86) PCT No.: PCT/CN2006/003371
§ 371 (c)(1),
(2), (4) Date: Jan. 25, 2010

(87) PCT Pub. No.: WO2008/046257
PCT Pub. Date: Apr. 24, 2008

(65) Prior Publication Data
US 2010/0150192 A1    Jun. 17, 2010

(30) Foreign Application Priority Data
Oct. 13, 2006    (CN) .......................... 2006 1 0063129

(51) Int. Cl.
*H01S 3/04*    (2006.01)

(52) U.S. Cl. ....................................... 372/36; 372/50.12
(58) Field of Classification Search .................... 372/35, 372/36; 438/660; 385/19; 257/98
See application file for complete search history.

(56) References Cited

U.S. PATENT DOCUMENTS

| | | | |
|---|---|---|---|
| 6,577,658 B1 * | 6/2003 | Lee et al. ................... | 372/45.01 |
| 2002/0048422 A1 * | 4/2002 | Cotteverte et al. ................. | 385/4 |
| 2004/0247009 A1 * | 12/2004 | Noda et al. ...................... | 372/99 |
| 2008/0259984 A1 * | 10/2008 | Nagatomo .................... | 372/50.1 |
| 2010/0054290 A1 * | 3/2010 | Hatakeyama ................... | 372/36 |

* cited by examiner

*Primary Examiner* — Minsun Harvey
*Assistant Examiner* — Tuan N. Nguyen
(74) *Attorney, Agent, or Firm* — Jackson IPG PLLC; Demian K. Jackson

(57) ABSTRACT

A laser pump cavity includes a heat sink holder with a central through hole, a plurality of slot portions, and a plurality of single emitters. The single emitter includes a heat sink and a single core disposed on the heat sink. The slot portions are uniformly spaced and surround the through hole. The single emitters are connected end to end, thereby forming at least one single emitter array. The at least one single emitter array is disposed in corresponding slot portions with each single core facing the through hole.

7 Claims, 3 Drawing Sheets

LASER PUMP CAVITY

BACKGROUND OF THE INVENTION

1. Field of the Invention

The present invention relates to laser pump cavities, and more particularly to a central injection pump cavity employing single-core high-power laser diodes.

2. Description of the Related Art

Generally, side pumped modules adopt central injection of multiplex laser, and use laser diode arrays (LDAs) as pump source. Such pump modules generally have a plurality of LDAs and each LDA is an independent pump source. The LDA usually has a plurality of light emitting diode bars (LED bars) which are serially connected with each other mounted on a heat sink, and each one of the LED bars has a plurality of single cores. Therefore, the LDA is complicated in structure and consequently low in rate of finished products, and the LDA is defective in stability. In addition, the LDA is liable to generate a malfunction when even one of the single cores is damaged.

What is needed, therefore, is a laser pump cavity that can overcome the above-described deficiencies.

SUMMARY OF THE INVENTION

In one preferred embodiment, a laser pump cavity includes a heat sink holder with a central through hole, a plurality of slot portions, and a plurality of single emitters. The single emitter includes a heat sink and a single core disposed on the heat sink. The slot portions are uniformly spaced and surround the through hole. The single emitters are connected end to end, thereby forming at least one single emitter array. The at least one single emitter array is disposed in corresponding slot portions with each single core facing the through hole.

Other novel features and advantages will become more apparent from the following detailed description when taken in conjunction with the accompanying drawings.

BRIEF DESCRIPTION OF THE DRAWINGS

The components in the drawings are not necessarily drawn to scale, the emphasis instead being placed upon clearly illustrating the principles of at least one embodiment of the present invention. In the drawings, like reference numerals designate corresponding parts throughout various views, and all the views are schematic.

DETAILED DESCRIPTION OF PREFERRED EMBODIMENTS

Reference will now be made to the drawings to describe preferred and exemplary embodiments in detail.

Figure 1:
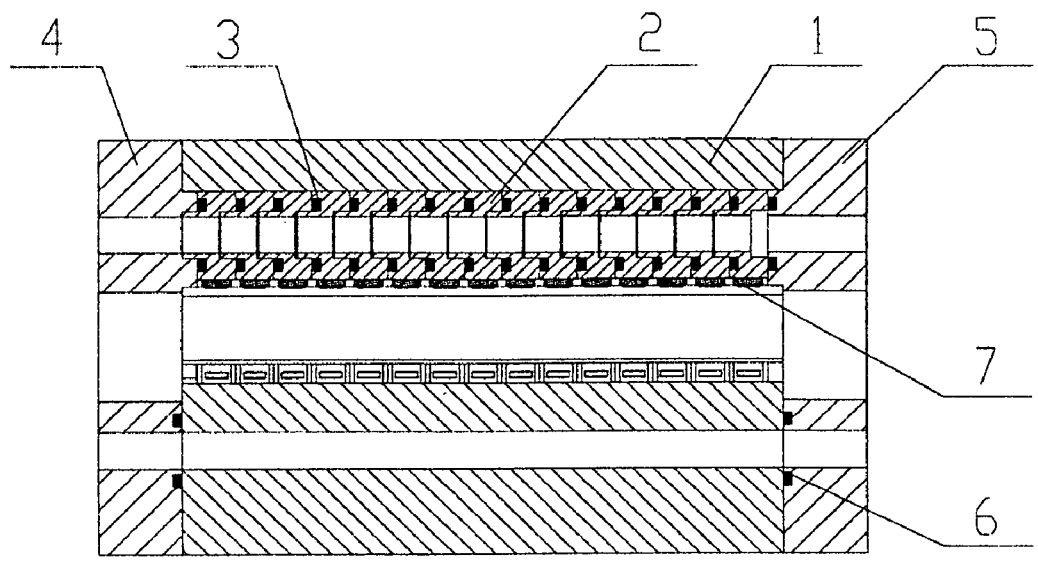
FIG. 1 is a schematic, cross-sectional view of a laser pump cavity according to a first embodiment of the present invention, the laser pump cavity including a heat sink holder, the heat sink holder including a plurality of single emitters.

Referring to FIG. 1, a central injection laser pump cavity according to a first embodiment of the present invention is shown. The pump cavity includes a heat sink holder 1, a plurality of heat sinks 2, a plurality of ring-shaped portions 3, a first board 4, a second board 5, a plurality of annular portions 6, and a plurality of single core 7. One single core 7 and one corresponding heat sink 2 constitute a single emitter. The heat sink 2 is substantially made of one or more of high heat-conducting and easily-machined metal materials.

Figure 2:
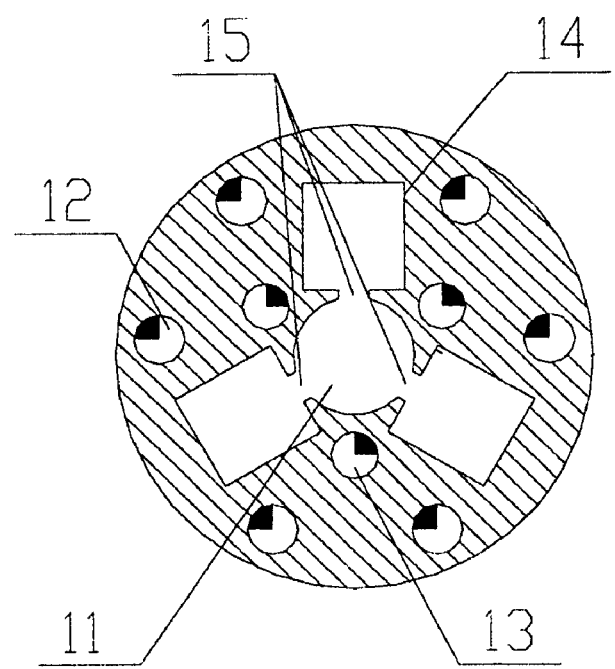
FIG. 2 is a schematic, side cross-sectional view of the heat sink holder shown in FIG. 1.
Figure 3:
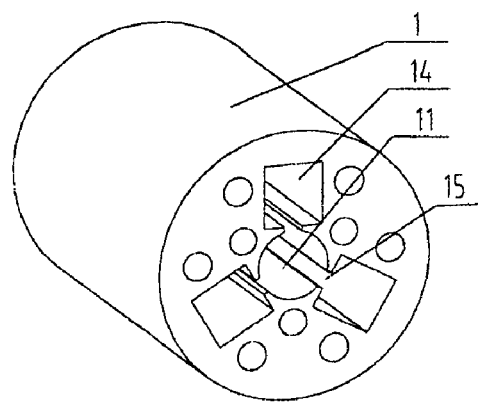
FIG. 3 is an isometric view of the heat sink holder shown in FIG. 1.

Referring to FIG. 2, and FIG. 3, the heat sink holder 1 is generally a circular cylinder, which is substantially made of one or more of high heat-conducting and easily-machined metal materials. The heat sink holder 1 has a cylindrical central through hole defined therein. The through hole has two openings opposite to each other which are respectively formed in the center of two circular surfaces of the heat sink holder 1. The through hole is encircled by an inner surface which can be made by a process of exquisite processing, sputtering, evaporating or electroplating, and the inner surface is of high reflectivity. The inner surface defines a pump cavity 11 therein. A plurality of cooling channels 13 are defined thereof adjacent to the through hole, which are configured for cooling the heat sink holder 1. A plurality of slot portions 14 are parallel formed along with a central axis of the through hole and uniformly spaced with each other around the through hole. The slot portions 14 each define an accommodating space that is compatible to the shape of the single emitter. A plurality of slots defined where the slot portions 14 communicating the through hole are served as incident openings 15 of single emitter pump lights.

Figure 4:
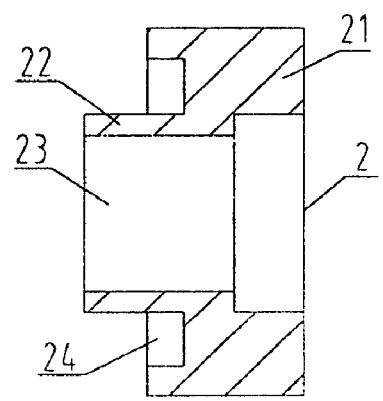
FIG. 4 is a schematic, cross-sectional view of the single emitter shown in FIG. 1.
Figure 5:
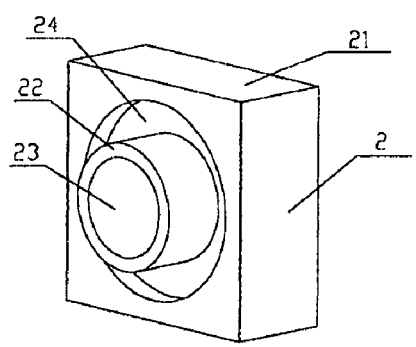
FIG. 5 is an isometric view of the single emitter shown in FIG. 1.

Referring to FIG. 4 and FIG. 5, the heat sink 2 includes a main body 21 which is substantially rectangular, a protruding portion 22 extending out from a side surface of the main body 21. The protruding portion 22 is substantially a circular cylinder. A shoulder hole 23 is defined thereof through the main body 21 and the protruding portion 22 sharing a same cylinder axis with the protruding portion 22. The shoulder hole 23 has a first round opening formed on the circular surface of the protruding portion 22, and a second round opening formed on the side surface of the main body 21. An annular concave 24 is defined thereof on the surface from where the protruding portion 22 extending out. The concave 24 is coaxial with the protruding portion 22. An inside diameter of the annular concave 24 is approximately equal to an outside diameter of the protruding portion 22, therefore the ring-shaped portion 3 can be received therebetween. The single core 7 is disposed on a surface of the main body 21. Each one of the single emitter is disposed in corresponding one of the slot portions 14, with the single core 7 facing to the through hole.

The first opening has a diameter lesser than a diameter of the second opening. The outside diameter of the protruding portion 22 is approximately equal to the diameter of the second opening. Plural single emitters can be pressed tightly in a line by coordination of side surfaces of the cylinders 22 and the second openings of the shoulder holes 23. That is, arranging the protruding portion 22 into the second opening of the shoulder hole 23 and connecting the single emitters end to end, thereby forming a single emitter array. The ring-shaped portion 3 has an inside diameter equal to the outside diameter of the protruding portion 22, and the outside diameter of the protruding portion 22 is compatible with an outside diameter of the second opening of the shoulder hole 23. The slot portion of the heat sink holder 1 has a size compatible with a size of the single emitter.

In the illustrated embodiment, the single emitter is cooled by straight-through water. The heat sinks 2 are sealed with ring-shaped portions 3. In an alternative embodiment, the heat sinks 2 can also be sealed by coating sealing glue. The heat sinks 2 do not require for a specific water inlet or water outlet, and can use normal pure water as cooling medium.

The first board 4 and the second board 5 are disposed adjacent to top surface and undersurface of the heat sink holder respectively 1. The ring-shaped portions 3 are slightly deformed when pressing the first and second boards 4, 5 toward the heat sink holder 1, thus the heat sinks 2 are sealed much more hermetically. The top surface and undersurface of the heat sink holder 1 has a plurality of screws, and the first and second boards 4, 5 can be fixed with the heat sink holder 1 through bolts connection. The first and second boards 4, 5 and the heat sink holder 1 can be sealed with the annular portions 6. In an alternative embodiment, the first and second boards 4, 5 and the heat sink holder 1 can be sealed with sealing glue. In the illustrated embodiment, there are six screws in top surface and undersurface, respectively.

The laser pump cavity has a structure of multi-stage serial connection of single emitters. Thus, the laser pump cavity is of simplified structure and convenient maintenance, and can achieve a great solid laser output. The laser pump cavity can be used in a side pumped module, and because the modularization of the laser pump cavity, the side pumped module has simplified structure and improved stability.

Figure 6:
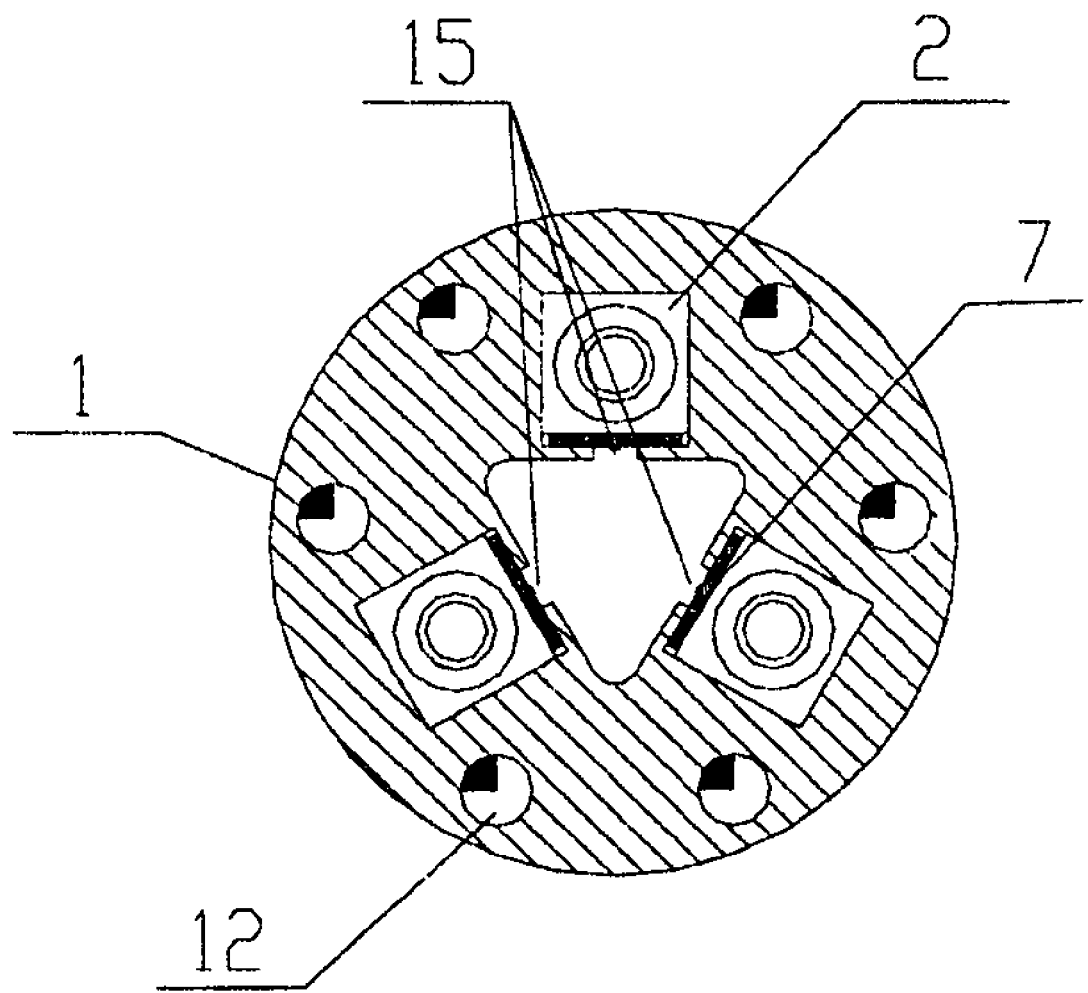
FIG. 6 is a schematic, side cross-sectional view of a heat sink holder of a laser pump cavity according to a second embodiment of the present invention.

Referring to FIG. 6, a laser pump module according to a second embodiment of the present invention is shown, which has a similar structure with the laser pump module. However, the laser pump module has a through hole with regular polygon openings, such as regular triangle in FIG. 6. In this embodiment, the through hole is used for accommodating laser diodes, and a reflective cavity is served as a cooling channel. Compared with the first embodiment, the cooling channels 13 are omitted. An amount of slot portions corresponds with sides of the regular polygon openings.

It is to be understood, however, that even though numerous characteristics and advantages of exemplary and preferred embodiments have been set out in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A laser pump cavity comprising: a heat sink holder having a central through hole; a plurality of slot portions uniformly spaced and surrounding the through hole; and a plurality of single emitters, each single emitter comprising: a heat sink; and a single core disposed on the heat sink; wherein the single emitters are connected end to end forming at least one single emitter array, the at least one single emitter array being disposed in corresponding slot portions with each single core facing the through hole;

wherein each heat sink comprises a main body and a protruding portion extending outward from a side surface of the main body, wherein a shoulder hole is formed therein that having a first opening on a top surface of the protruding portion and a second opening on a side surface of the main body and opposite to the first opening, and a diameter of the first opening being lesser than a diameter of the second opening such that the protruding portion of one heat sink being capable of inserted into the second opening of another heat sink;

wherein a reflective cavity is disposed in the through hole that is used as pump cavity.

2. The laser pump cavity as claimed in claim 1, wherein the main body has a substantially rectangular structure, and the protruding portion has a substantially circular cylindrical structure.

3. The laser pump cavity as claimed in claim 2, wherein the main body comprises a concave slot configured for receiving a sealing structure.

4. The laser pump cavity as claimed in claim 1, wherein the through hole is a circular hole or a regular polygon hole.

5. The laser pump as claimed in claim 4, wherein the through hole is encircled by an inner surface which can be made by a process of exquisite processing, sputtering, evaporating or electroplating, and the inner surface is of high reflectivity.

6. The laser pump as claimed in claim 1, further comprising a first board and a second board, the first and second boards being disposed adjacent two opposite surfaces of the heat sink holder, respectively.

7. The laser pump cavity as claimed in claim 6, wherein sealing apparatuses are provided between the first board and heat sink holder, and between the second board and the heat sink holder.

* * * * *